Patented Nov. 21, 1933

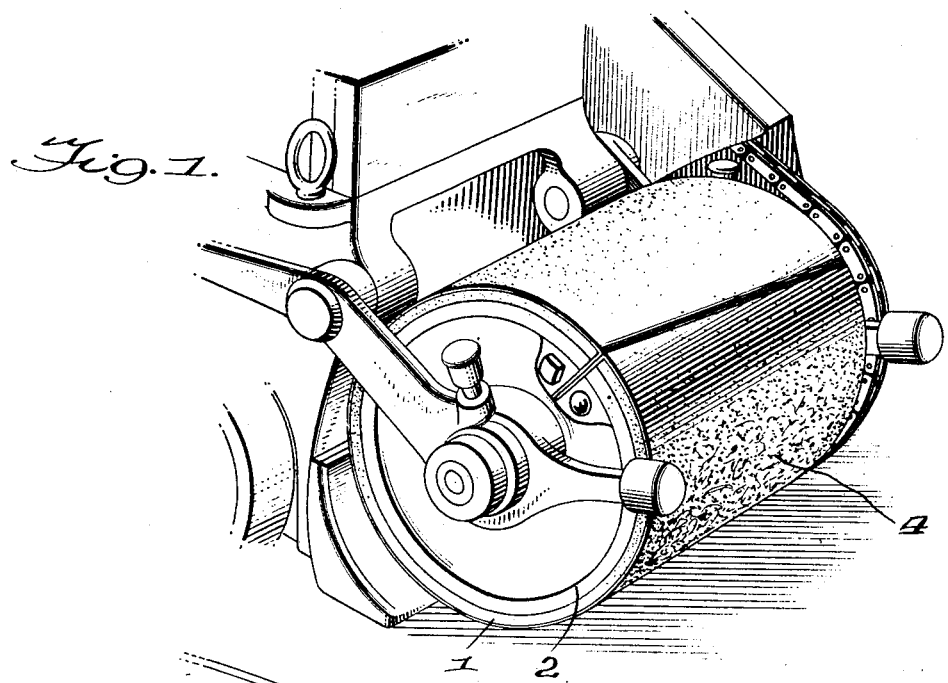
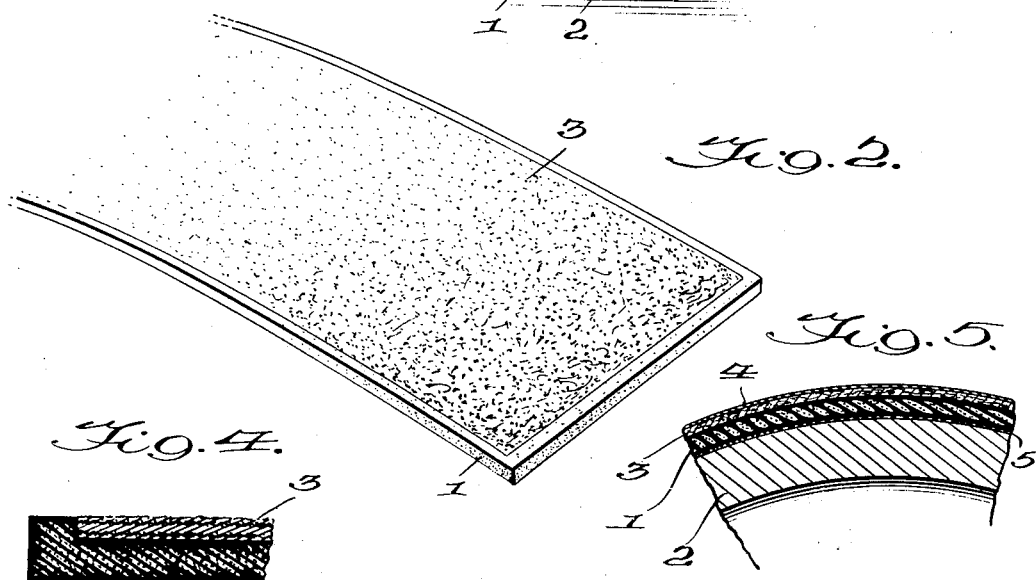
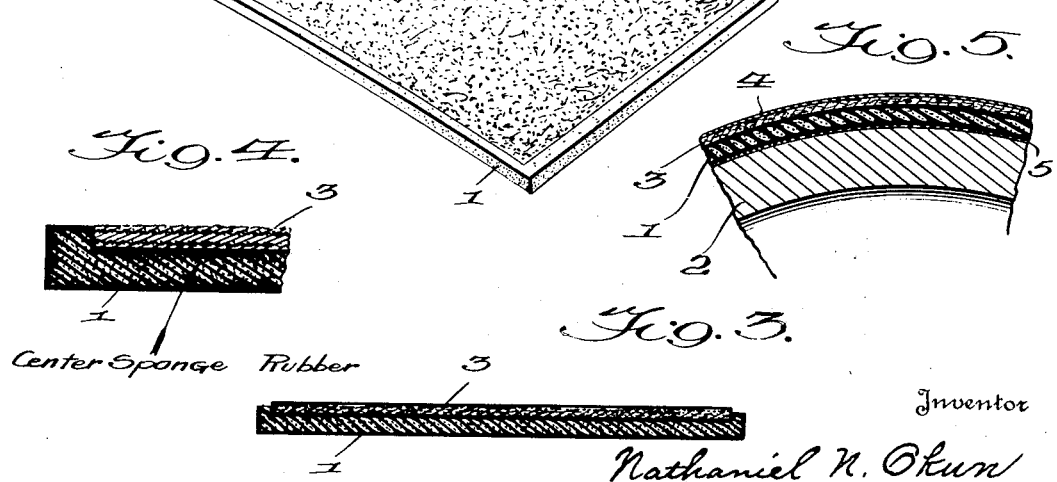

1,936,482

UNITED STATES PATENT OFFICE 1,936,482

COVERING FOR SANDING-DRUMS

Nathaniel N. Okun, New York, N. Y., assignor to John T. Swanson Company, Inc., New York, N. Y., a corporation of New York Application June 10, 1931. Serial No. 543,454

5 Claims. (Cl. 51—194)

My invention relates to an improvement in coverings for sanding drums.

Various means have been employed in sandpapering machines for surfacing hardwood and other floors. The best known method is to apply sand-paper to the surface of a rotary drum and to rotate the drum in contact with the floor to be surfaced or finished.

One of the problems is to finish the hard and soft grains of flooring alike or uniformly. Another problem is to absorb or prevent vibration, which results in a ridged or wavy effect upon the surface of the floor.

The object of the present invention is to solve these problems by providing a shock absorbing drum surface which will afford a backing for the sand-paper applied thereto, having the effect of absorbing the vibration with the result that the abrading surface will act with uniformity on the hard and soft grains of the wood, and, by eliminating vibration, create a finished surface without the usual irregularities and wavy effect which has resulted from the use of all known floor surfacing machines.

This invention comprises a covering for the drum, which includes a composite of rubber of more or less spongy or porous consistency, and a facing of filamentous or fibrous material, preferably of the nature of felt, as a facing cemented to and made integral with the cushion-like backing of rubber or equivalent material, the composite material thus constituted being secured to the drum by some adhesive substance such as rubber cement.

In the accompanying drawing:

Fig. 1 is a fragmentary view in perspective of the drum end of a floor surfacing machine;

Fig. 2 is a view in perspective of the drum covering;

Fig. 3 is a cross-section thereof;

Fig. 4 is an enlarged fragmentary section taken at right-angles to the section shown in Fig. 3; and Fig. 5 is an enlarged detail in section.

The covering is flexible and preferably made in at least two layers, the foundation layer 1 being of rubber or equivalent material, to have a cushioning effect.

When of rubber, the interior portion is preferably of a spongy or porous nature, to have the effect of absorbing vibration and still present a sufficiently compressible and elastic foundation to rest around and in contact with a cylindrical drum 2, which it surrounds, and to which it is secured by rubber cement or the like 5.

The facing 3 is preferably of some filamentous material of a textile nature, such as felt, although not necessarily so and this is embedded in the rubber foundation layer 1.

This filamentous material is preferably embedded or sunk in the foundation layer as shown in Figs. 2, 3, and 4, although this particular arrangement is not imperative. The composite thus constructed is sufficiently flexible to make it readily conform to the cylindrical shape of the drum and when thus curved it gives tension to the facing 3 and both compression and tension to the foundation layer, thus affording a combination of materials and elements which has the effect of keeping the sand-paper in continual and uniform contact with the surface of the floor being finished and preventing the pounding and jumping vibration on the surface of the floor, so prevalent with sanding-drums hitherto in use, the foundation layer absorbing the vibration and giving a uniform pressure to the facing layer as it rotates in contact with the floor.

A floor finished with this covering presents a smooth, uniform and highly polished surface, free of waviness and irregularities and with the hard and soft grains treated alike.

The particular materials pointed out in the formation of this drum covering might be varied as to comparative thickness and the choice of textile and rubber, although the preferred combination, as stated, is some form of tough felt for the face, securely fastened on a foundation layer of flexible and spongy material, such as some suitable type of sponge rubber.

Some abrasive material such as sand-paper 4 is fastened over the surface of the drum thus faced in any approved manner, as, for instance, as viewed in Fig. 1 of the drawing.

I claim:

1. A covering for sanding-drums comprising a foundation layer of spongy elastic material having an external depressed portion the edges of which are spaced inwardly from the edges of the elastic material, and an outer layer of filamentous material seated and secured in said depressed portion with its outer surface approximately flush with the outer surface of the elastic material at opposite sides of the depressed portion, to absorb vibration and shocks and insure uniform pressure and contact with the surfaces being treated.

2. A covering for sanding drums comprising a foundation layer of elastic material having the interior only thereof of spongy texture with the surface thereof of non-spongy and smooth texture, and an outer layer of filamentous material secured to said elastic material, said covering being constructed to absorb vibration and shocks and insure uniformity of contact with the surface to be treated.

3. A covering for sanding-drums comprising a foundation layer of elastic material having the interior only thereof of spongy texture with the surface thereof of non-spongy and smooth texture, said elastic layer having an external depressed portion the edges of which are spaced inwardly from the edges of the elastic material, and an outer layer of textile material to receive a sanding strip and seated and secured in the depressed portion with its outer surface approximately flush with the outer surfaces of the elastic material at opposite sides of the depressed portion, said covering being constructed to absorb vibration and shock and insure uniform pressure and contact with the surface being treated.

4. A covering for sanding drums comprising a foundation layer of sponge rubber-like material adapted to surround the periphery of the sanding drum, an outer layer of filamentous material applied and secured directly to said foundation layer of sponge material and surrounding the same, and abrasive material applied to the periphery of said outer layer, said covering being constructed to absorb vibration and give uniform pressure to the abrasive material as it rotates in contact with a floor.

5. The combination with a rotary sanding drum, of a covering therefor comprising a foundation layer of sponge rubber surrounding the periphery of the sanding drum, an outer layer of filamentous material applied and secured directly to said foundation layer of sponge rubber and surrounding the same, and abrasive material carried by the periphery of said outer layer, said covering being constructed to absorb vibration of the sanding drum and give uniform pressure to the abrasive material as it rotates in contact with a floor.

NATHANIEL N. OKUN.